(12) United States Patent
Winter

(10) Patent No.: US 11,537,639 B2
(45) Date of Patent: Dec. 27, 2022

(54) RE-IDENTIFICATION OF PHYSICAL OBJECTS IN AN IMAGE BACKGROUND VIA CREATION AND STORAGE OF TEMPORARY DATA OBJECTS THAT LINK AN OBJECT TO A BACKGROUND

(71) Applicant: IDEMIA Identity & Security Germany AG, Bochum (DE)

(72) Inventor: Christian Winter, Rheda-Wiedenbrück (DE)

(73) Assignee: IDEMIA IDENTITY & SECURITY GERMANY AG, Bochum (DE)

( * ) Notice: Subject to any disclaimer, the term of this patent is extended or adjusted under 35 U.S.C. 154(b) by 406 days.

(21) Appl. No.: 16/412,991

(22) Filed: May 15, 2019

(65) Prior Publication Data
US 2020/0073877 A1 Mar. 5, 2020

(30) Foreign Application Priority Data
May 15, 2018 (EP) .................................... 18172453

(51) Int. Cl.
*G06F 16/28* (2019.01)
*G06F 16/21* (2019.01)
(Continued)

(52) U.S. Cl.
CPC ............ *G06F 16/289* (2019.01); *G06F 16/21* (2019.01); *G06F 16/784* (2019.01);
(Continued)

(58) Field of Classification Search
CPC ...... G06F 16/289; G06F 16/21; G06F 16/784; G06K 9/00295; G06K 9/00718; G06K 9/00765
(Continued)

(56) References Cited

U.S. PATENT DOCUMENTS 6,975,346 B2 12/2005 Kumhyr
7,113,641 B1 9/2006 Eckes et al.
(Continued)

FOREIGN PATENT DOCUMENTS

JP 2007026330 A 2/2007

OTHER PUBLICATIONS

European Search Report issued for corresponding European Patent Application No. EP18172453.5 dated Dec. 21, 2018.
(Continued)

*Primary Examiner* — Shahid A Alam
(74) *Attorney, Agent, or Firm* — Moore & Van Allen PLLC; Henry B. Ward, III

(57) ABSTRACT

Re-Identification of physical objects in an image background is made possible by the use of temporary data objects (i.e., video cookies). Image data including an image object representing a physical object in at least one of a plurality of backgrounds is pre-stored in a database. Identification data for the image object and image background data is extracted from the image object and a comparison is made to determine if the identification data matches identification data in the database. In the event no match is found, a temporary data object is created and stored in the database that links the identification data and the image background data. If an identification data match is found, it is determined whether a temporary data object exists in the database. If no temporary data object exists, one is created and stored in the database. If a temporary data object is determined to exist in the database, it is determined whether the temporary data object fulfills a predetermined condition(s). If the predetermined condition(s) is not fulfilled, a default action is executed and if the predetermined condition(s) are fulfilled, a specific action is executed.

16 Claims, 3 Drawing Sheets

(51) Int. Cl.
*G06F 16/783* (2019.01)
*G06K 9/00* (2006.01)
(52) U.S. Cl.
CPC ..... *G06K 9/00295* (2013.01); *G06K 9/00718* (2013.01); *G06K 9/00765* (2013.01)
(58) Field of Classification Search
USPC .......................................................... 707/792
See application file for complete search history.

(56) References Cited

U.S. PATENT DOCUMENTS

| | | | | |
|---|---|---|---|---|
| 8,358,342 | B2 * | 1/2013 | Park ...................... | G06F 16/784 |
| | | | | 348/136 |
| 2007/0005795 | A1 * | 1/2007 | Gonzalez ................ | G06F 16/40 |
| | | | | 707/E17.009 |
| 2008/0166027 | A1 | 7/2008 | Jeong et al. | |
| 2011/0173235 | A1 * | 7/2011 | Aman .................... | G06Q 10/10 |
| | | | | 707/792 |
| 2013/0294642 | A1 * | 11/2013 | Wang ................. | G06K 9/00261 |
| | | | | 382/103 |
| 2015/0019162 | A1 * | 1/2015 | Hodge .................. | G06F 1/1626 |
| | | | | 702/150 |
| 2015/0067600 | A1 * | 3/2015 | Steinberg ........... | G06K 9/00261 |
| | | | | 715/822 |
| 2015/0199575 | A1 * | 7/2015 | Dudovich ............... | G06F 16/51 |
| | | | | 382/103 |
| 2018/0018508 | A1 * | 1/2018 | Tusch ................ | G06K 9/00771 |

OTHER PUBLICATIONS

Office Action issued by the European Patent Office for European Patent Application No. 18 172 453.5, dated Aug. 20, 2021.

* cited by examiner

RE-IDENTIFICATION OF PHYSICAL
OBJECTS IN AN IMAGE BACKGROUND
VIA CREATION AND STORAGE OF
TEMPORARY DATA OBJECTS THAT LINK
AN OBJECT TO A BACKGROUND

FIELD OF THE INVENTION

The invention refers to re-identifying a physical object before an image background, e.g. a person on video data in a shop area.

BACKGROUND OF THE INVENTION

Automatic identification of an object in digital image or video data is a modern issue of growing importance. Often, but not exclusively, this is applied in the context of public safety issues. Video analysis has become a significant forensic resource for investigation processes related to crimes and during court proceedings. Analysts and investigators involved with using these video data as an investigative resources face an enormous workload. Existing software platforms may offer a user interface built on a set of video analytics.

Recently, the face recognition, i.e., identification of a subject based on recognition of its face, has been improved considerably. Face recognition methods may be based on so-called jets that are extracted from a digitized image with Gabor filters of different magnitudes and orientations, said jets being arranged at the nodes of a grid which is adapted to be subjected to displacement, scaling and deformation. This graph, i.e. the structure of the grid and the jets associated with the nodes of the grid, are compared with a reference graph comprising the structure to be recognized. For this purpose, the optimum form of the grid is determined by a two-phase optimization of a graph comparison function. In the first phase, the size and the position of the graph are optimized simultaneously; in the second phase, the intrinsic form of the graph is optimized.

Mallat filter functions may be used instead of Gabor filter functions.

In U.S. Pat. No. 7,113,641 a method of face recognition is disclosed that comprises the steps of providing at least one reference graph comprising digitized reference image data of corresponding reference images, the reference graph or each reference graph comprising a net-like structure, the respective net-like structure being defined in that specific reference image data have assigned thereto nodes which are interconnected by links in a predetermined manner, and jets, each node having a jet assigned thereto and each jet comprising at least one sub-jet which is determined by convolutions of at least one class of filter functions with different magnitudes and/or orientations with the reference image data of the corresponding reference image at the specific node, or by convolutions of at least one class of filter functions with different magnitudes and/or orientations with color-segmented reference image data of the corresponding reference image at the specific node, or by color information on the reference image data at the specific node, or by texture descriptions of the corresponding reference image at the specific node, said texture descriptions being gained by statistical methods, or by motion vectors at the specific node, said motion vectors being extracted from successive reference images; determining an optimum image graph from the digitized image data for each reference graph, said optimum image graph representing for a specific reference graph the optimum adaptation to said reference graph and being determined by projecting the net-like structure of said specific reference graph into the image data whereby the structure of the image graph is defined, and determining sub-jets of the image graph at the nodes defined by its structure, said sub-jets corresponding to at least part of the determined sub-jets of the specific reference graph, and the projection of the net-like structure of said specific reference graph being varied until a graph comparison function which compares the jets of the image graph with the corresponding jets of said specific reference graph becomes optimal; and associating the structure or each structure with the reference image corresponding to the reference graph for which the graph comparison function is optimal with respect to the optimal image graph determined for said reference graph.

For security applications, it may be necessary to provide large and persistent watch lists for tracking and identifying persons. Other applications, e.g. smaller applications for commercial uses but maybe also research applications may not need to identify a person or an object against information stored in a watch list. Rather it should be sufficient to re-identify a person or an object in a situation or scenario which resembles a previous situation or previous scenario encountered already before. This should be much cheaper and more efficient in terms of storage and speed than the keeping of watch lists and the comparing against watch lists. Whereas many commercial application may aim at re-identifying persons, in principle research application might also refer to re-identifying animals.

In view of the above, it is an object of the present disclosure to provide an alternative method for re-identifying an object before, i.e. in front of a background.

DESCRIPTION OF THE INVENTION

In view of the above, it is an object of the present disclosure to provide an alternative method for re-identifying an object before, i.e. in front of a background.

The present invention provides:

A computer-implemented method of re-identifying a physical object before an image background, the method comprising:

providing image data comprising an image object representing a physical object before at least one image background of a set of image backgrounds pre-stored in a database;

extracting identification data for the image object as well as image background data from the image data;

determining if the identification data matches identification data stored in the database, and if no match is found, creating a temporary data object linking the extracted identification data and the extracted image background data and storing the temporary data object and the extracted identification data in the database, else determining if a temporary data object linking the extracted image background data and the matched identification data has already been stored in the database, and if no temporary data object is found, creating a temporary data object linking the extracted identification data and the extracted image background data and storing the temporary data object in the database, else determining if the temporary data object fulfills at least one predetermined condition, and if no predetermined condition is fulfilled, executing a default action with respect to the temporary data object, else executing a specific action to call attention of an external user.

When comparing with the internet, users may enter virtual rooms such as virtual shops or the like. There, web cookies may be used to re-identify a user. A web cookie typically is a small piece of data sent from a website, said piece of data is then stored on the user's computer by the user's web browser while the user is browsing. Typically, web cookies were designed to provide a mechanism for websites to remember stateful information, such as items added in the shopping cart in an online store, or to record the user's browsing activity, e.g. including clicking particular buttons, logging in, or recording which pages were visited in the past. Web cookies may also be used to remember arbitrary pieces of information that the user previously entered into form fields such as names, addresses, passwords, and credit card numbers. Thus, extending this concept from the virtual reality into the real world, instead of using persistent watch lists to track and identify persons on videos, temporary data objects are used to re-identify a person. These temporary data objects may also be termed video cookies. Here, image data may typically indicate a physical object such as a person or animal. This physical object may be imaged before some image background. Unlike the person to be re-identified, the image background or a set of image background are known. Even if a device such as a video camera scans a sequence of views, the image backgrounds are known and it should be very cheap to re-identify these backgrounds.

Working with a database, the task of recognizing or re-identifying an object is to check against a database having stored image data suitable for providing a characteristic of said object. Since the possible backgrounds are in principle known, focus will be in the object, first. The comparison will not use the entire object but identification data extracted from the image object. The same is done for the background identification. Thus, with the identification data for the image object, it is a subset of data of the image object, e.g. including characteristics according to well-understood face-identifying or person identifying algorithms, which is to be compared with entries in the database. If no match for the object, that is for the identification data, is found in the database, the object is assumed to be unknown in this context. Then a new entry for the object will be created in the database. Said entry includes or consists of a temporary data object. Said temporary data object will link the extracted identification data and the extracted image background data. In this way, an association, or a mapping of the extracted identification data and the extracted and identified background data is accomplished. The newly created temporary data object and the extracted identification data will be stored in the database.

It should be understood that matching the extracted image background only, or likewise matching the extracted identification data for the object, only—which should be a rare case—would not result in a valid match since no suitable link between the extracted identification data for the object and the extracted background data is found. Thus, if the identification data is found, i.e. a match for the identification data is found in the database, but no temporary data object linking the extracted image background data and the matched identification data is found in the database, this also requires creating a new temporary data object. Said new temporary data object will link the extracted identification data and the extracted image background data similar as described above. The newly created temporary data object will be stored in the database. If a match for a temporary data object linking the identification data and the background is found in the database, it has to be determined if said temporary data object fulfills at least one predetermined condition. If it does not fulfill a predetermined condition, a default action with respect to the temporary data object will be executed. Otherwise, if at least one predetermined condition is met, a specific action to call attention of an external user will be executed.

In the computer-implemented method the temporary data object may comprise a timestamp indicating the creation time of the temporary data object, and a match counter indicating the number of times a match for this temporary data object has been found.

Thus the temporary data object may carry a pre-determined time identification such as a timestamp. Said timestamp will allow determining the creation time of the temporary data object. In other words it will allow determining the age of the temporary data object by comparing the current time with the time indicated by the timestamp. Further, a match counter will indicate how often a match for this temporary data object has been found.

In the computer-implemented method the providing of the image data may comprise recording video data and providing at least one video frame of the recorded video data.

The image data can be provided as one or more video frames of recorded video data. Providing the image data may comprises the recording of the video data, in particular, in real time. The analyzing of the image data may also be performed in real time. In this case, actions such as issuance of an alarm or a request for adjudication may be taken in real time in response to the result of determining whether the image object corresponds to the particular physical object. In the computer-implemented method the analyzing of the image data and the recording of the video data may be performed in real time.

In the computer-implemented method the physical object may be a person or a face of a person.

The image object, i.e., the object comprised in the image or image data, corresponds to a real world, i.e. a physical object and in order to identify a particular physical object it has to be determined whether or not the image object corresponds to the particular physical object. It goes without saying that the physical object represented by the image object may be different from the particular physical object.

The particular physical object may be a particular person and the other physical object may be another person known to frequently accompany the particular person. Images of the particular person may have been recorded in the past. This information is made available when determining whether the image object corresponds to the particular physical object based on the identification data.

In the computer-implemented method the predetermined condition may comprise at least one of a temporal condition, and a repetition condition, or both.

Specifically, a temporal condition may refer to the age of the temporary object with respect to the current time and date. Further, a repetition condition may refer to finding out how often a match occurred, i.e. how often a re-match for a specific temporary data object has been found. It should be understood that timestamp and match counter, i.e. temporal condition and repetition condition, may be combined, e.g. to find out how often a match occurred within a pre-defined time span.

In the computer-implemented method the temporal condition may comprise determining whether the timestamp of the temporary data object is within a time window delimited by a past time $t_2$ and a past time $t_1$, where $t_2$ is earlier than $t_1$.

The computer-implemented method as described may comprise, if the timestamp of the temporary data object is earlier than $t_2$, resetting the timestamp of the temporary data object to the current time and resetting the match counter.

These two description of applying a temporal condition to the temporary data object focus on when to start applying a temporal condition and how long to apply it, and further, using the repetition condition in addition to the temporal condition. For example, it may be more interesting to apply a specific temporal condition after some time has passed, e.g. a few hours or even a day, instead of the object returning after a few minutes. This may correspond to delaying the applying of the temporal condition. Likewise, if a temporal condition was not met for a longer period of time, it may be concluded that the temporary data object is quite old. Therefore it may be decided to renew it. It should be noted that even some automated deleting or pruning of the database may be implemented such that for instance all temporary data objects may be deleted which are older than some predefined time.

In the computer implemented method the repetition condition may comprise determining if the match counter has reached a pre-determined threshold N, where N is an integer larger than 1, and resetting the match counter if the threshold has been reached.

In the computer implemented method the specific action may comprise an optical and/or acoustical signal, and the default action may comprise increasing the match counter by 1.

The optical or acoustical signal may comprise an optical, visual alarm on a display or using some specific light source to raise the awareness of the user. It may also comprise an acoustic signal.

In the computer implemented method the image backgrounds may comprise one or more of a sales area, at least a part of a shop, an exhibition area, and a display area, a showroom.

In the computer-implemented method the determining whether the image object corresponds to the physical object may comprise determining a probability measure of a matching of the image object with the physical object and further comprising determining that the image object corresponds to the physical object, if the determined probability measure exceeds a predetermined threshold; wherein the determining of the probability measure may comprise matching the image object with the physical object by comparing the identification data with pre-stored data of the particular physical object.

In the computer-implemented method the analyzing of the image data may comprise employing a face recognition procedure, in particular, comprising extracting jets from the image data.

The computer-implemented method may comprise the determining whether the image object corresponds to the particular physical object may comprise determining a probability measure of a matching of the image object with the particular physical object and determining that the image object corresponds to the particular physical object, if the determined probability measure exceeds a predetermined threshold. In particular, the determining of the probability measure may comprise matching the image object with the particular physical object by comparing the identification data with pre-stored data, i.e. reference data of the particular physical object, i.e. a reference physical object. It is very convenient to use some probability approach when identifying an object. In particular, according to an embodiment the probability measure may be determined based on the supplementary data in addition to the identification data extracted from the image data in order to improve the reliability of the identification result.

The invention also provides a computer program product, comprising one or more computer readable media having computer-executable instructions for performing the steps of the computer-implemented method according to the computer-implemented method described above.

The invention also discloses a system for re-identifying a physical object before an image background, comprising one or more cameras surveying one or more perspectives of a predefined area, at least one control station, at least one database, the at least one database and the at least one control linked with the one or more cameras, the control station configured to perform the computer-implemented method as described above.

Additional features and advantages of the present invention will be described with reference to the drawings. In the description, reference is made to the accompanying figures that are meant to illustrate preferred embodiments of the invention. It is understood that such embodiments do not represent the full scope of the invention.

DETAILED DESCRIPTION

Various illustrative embodiments of the disclosure are described below. In the interest of clarity, not all features of an actual implementation are described in this specification. It will of course be appreciated that in the development of any such an actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The following embodiments are described in sufficient detail to enable those skilled in the art to make use of the disclosure. It is to be understood that other embodiments would be evident, based on the present disclosure, and that system, structure, process or mechanical changes may be made without departing from the scope of the present disclosure. In the following description, numeral-specific details are given to provide a thorough understanding of the disclosure. However, it would be apparent that the embodiments of the disclosure may be practiced without the specific details. In order to avoid obscuring the present disclosure, some well-known circuits, system configurations, structure configurations and process steps are not disclosed in detail.

Figure 1:
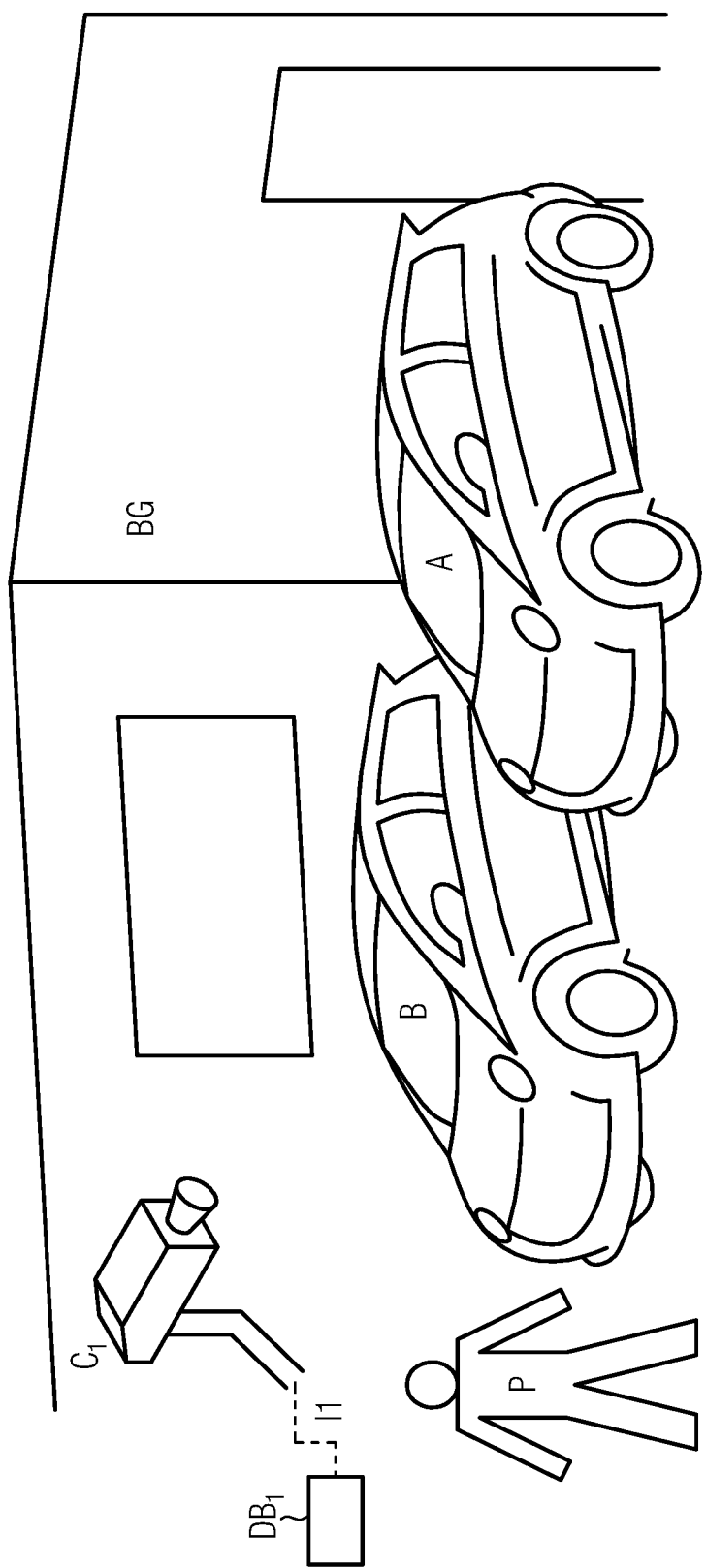
FIG. 1 illustrates an object being a person in a sales area.

FIG. 1 illustrates a scenario for an application according to the present disclosure. FIG. 1 illustrates an object—here—a person P in front of a background BG. Here, the BG represents a showroom or a sales area for cars. Here the cars are labelled A and B, respectively. It should be understood that the topic of a showroom with cars is only chosen as an example and other backgrounds and sales or economic scenarios may be possible, as well. FIG. 1 also illustrates a camera C1. Camera C1 may be a video camera for providing image data of the scenario. FIG. 1 also shows a database DB1. Camera C1 typically will be connected by line 11 with the database DB1. Line 11 may be a real network cable or may be a wireless connection. It should be understood that for simplicity of FIG. 1, only one camera C1 and only one database DB1 are illustrated. However, more than one camera and/or more than one database may be used. Camera C1 and database DB1 may be part of a video observation system (not shown). The video observation system may include a processor or a computer or the like for performing the analysis tasks. The computer may be integrated in the system or may be separately provided. It may also be a remote computer (not shown) that is used, for instance located in an office where a user such as sales personnel may be sitting.

For the background BG, here a showroom with cars, it should be understood that this background BG is known or pre-stored in the database DB1. It should be understood, again, that the specific scenario "showroom with cars", however, is only an example chosen for illustrational purposes.

FIG. 1 further illustrates items A and B of the background BG. Items A and/or B may represent items potentially interesting for a person P observing these items in the showroom. In the example of FIG. 1, items A and B represent cars.

Camera C1 provides image data comprising the image object representing the physical object before the image background BG. Here, focus is not primarily on conducting a real-time observation of person P and possibly actions of person P. Rather, the goal is to find out if said person P which by standing in front of background BG potentially may be showing interest in items A and/or B has already been in the same or at least very similar scenario some time before. Within such a task it may be helpful but not necessary to exactly know this person for example by name. The term "some time" may represent a predetermined time span such as hours, or days. Thus, often it may be of less interest if a person is re-identified already only minutes after said person was identified the first time. But it may be very helpful if it is determined that after some time the person has come back thereby potentially showing renewed or intensified interest in an item such as A and/or B, and thereby may be identified as a potential buyer of such items. For example, in shops, the system may inform the shop staff that the same person P that just entered the show room, was already in, say yesterday, and was interested in items A and/or B, in front of Background BG. The shop staff may then directly follow up the sales talk with this customer—even if the staff from a day or some time span before is not in or does not remember.

For this purpose, a temporary data object, i.e. a video cookie is used. For a corresponding method, the following has to be considered. The background BG is or should be known. There will always be ample of time to pre-condition the system such that the system, i.e. the camera C1 either observes only one background or only on part of a scene, an image etc.—or else if a moving, i.e. swiveling camera is used, said camera would observe a set of known backgrounds. In other words, in the example of FIG. 1, the showroom with the cars A and B should be known, or at least a portion or portions of said setup should be known.

The system, by using the camera C1, will then attempt to re-identify person P in front of background BG. This attempt is based on image data provided by the camera C1 (Event 110 of the method 100 depicted in FIG. 3) and then extracted from the image data (Event 120 of the method 100 depicted in FIG. 3) provided by the system. The extracted data represent identification data for the image object, i.e. the person P. It should be understood, that subsequent identification of the person P may be attempted by using well-understood algorithms for identifying the face of the person P or more than just the face of the person P, e.g. the entire person P. Further it should be understood that identification may use probabilistic techniques which eventually will provide a probability or likelihood that a person has been re-identified. By exceeding a predefined threshold for probability, a match for said object, i.e. person P will be signaled.

Figure 3:
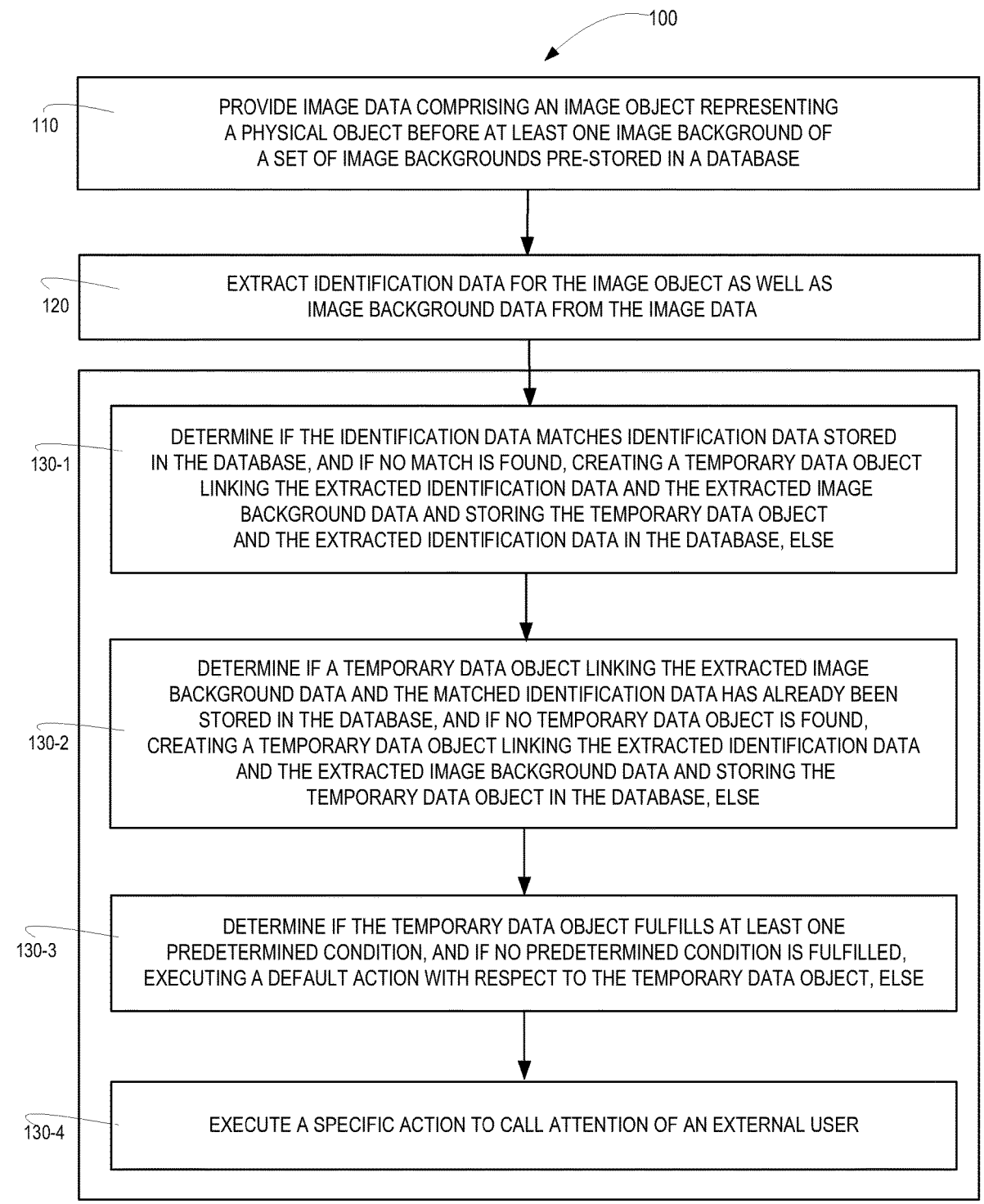
FIG. 3 illustrates a flow diagram of a method for re-identifying a physical object before an image background, according to specific embodiments of the invention.

If the person P cannot be identified, which means that no match is found in the database, the person P has to be assumed to be entirely new to the system and thus some characteristics suitable for identifying and re-identifying the person, such a facial characteristics, may be stored in the database (Event 130-1 of the method 100 depicted in FIG. 3).

If a match is found, i.e. if the person P can be re-identified with sufficient probability, the question will be if the person P was already previously seen before the background BG. Thus, the background has to be identified, in particular if the field of view of the camera periodically changes, for example when the camera is slowly moving. To find a match, a temporary data object, i.e. a video cookie that has been stored already previously has to be found. That temporary data object indicates a link or a mapping or a concatenation between the identification data for the person P and the extracted background image data for the background BG. If such a link is not found, it will be newly created (Event 130-2 of the method 100 depicted in FIG. 3). With said new creation, also a match counter may be set to 1, indicating one occurrence of a match for that link which links the person P and the background BG, i.e. it provides a small temporary data object linking the identification data for person P and the extracted image background data for background BG.

Instead, if such a link is found it may be further scrutinized testing specific conditions (Event 130-3 of the method depicted in FIG. 3). The link as implemented by the video cookie may carry at least a timestamp and a match counter. Thus the link, i.e. the video cookie may be tested for its "age" and also for its importance. The age of the temporary data object should indicate when, in comparison to the current time the temporary data object has been created. That is, choosing a predetermined maximum and/or minimum age of the link, the user may be notified accordingly. Also, if the temporary data object is quite old, say the person has come back to the shop after a few months or so, and provided the background has not changed, this may of lesser importance than a case in which the person has returned after a day or a few days. Also a minimum age of the temporary data object may be considered, i.e. a person returning after a few minutes may be of lesser interest than a person returning after an hour or a few hours, or days, respectively. Of course, these timespans may be selected according to the specific application of the user. The temporal condition may thus comprise determining whether the timestamp of the temporary data object is within a time window delimited by a past time $t_2$ and a past time $t_1$, where $t_2$ is earlier than $t_1$. Or, in other words, where $t_2$ indicates a time further in the past whereas $t_1$ indicates a more recent time.

Of course it may be determined that the temporary data object is too old, i.e. it is earlier/older than $t_2$. Thus the system may reset the timestamp of the temporary data object to the current time and/or may also reset the match counter.

It goes without saying that the times $t_1$, and $t_2$ may be pre-programmed, respectively.

Further, the repetition condition may comprise determining if the match counter has reached a pre-determined threshold N, where N is an integer larger than 1, and resetting the match counter if the threshold has been reached. Here, in principle, also an upper limit may be defined, i.e. if the match counter has reached a value which is considerably higher than an average value, it may be double-checked if the match counter is correctly handled and it may be reset, if necessary.

Finally if a match has been found, this should be indicated to the staff or personnel of the shop via optical and or acoustical alarm measures (Event 130-4 of the method 100 depicted in FIG. 3). Unlike a default action, where only a counter may be increased, these measures aim at indicating necessary action.

Figure 2B:
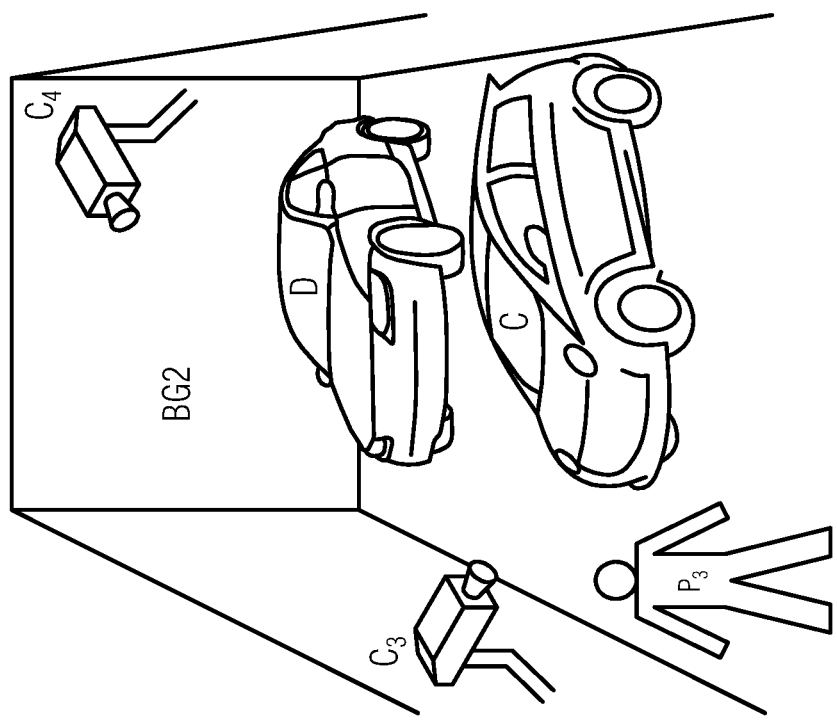
FIG. 2B illustrates a sales area with cars before a background with an object being a person showing interest, according to specific embodiments of the invention.
Figure 2A:
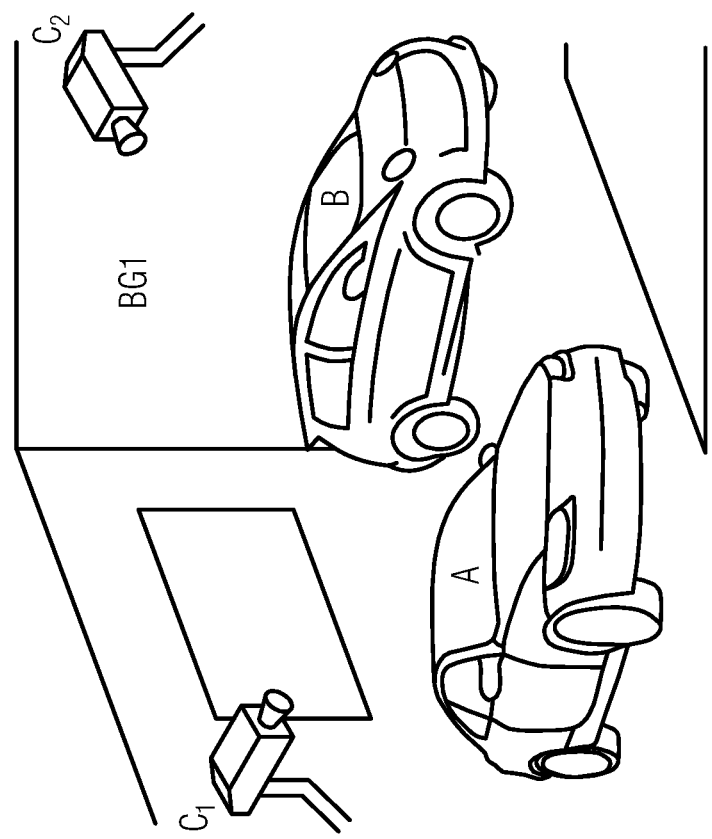
FIG. 2A illustrates a sales area with cars before a background, according to specific embodiments of the invention.

FIGS. 2A and 2B illustrate a slightly different scenario than FIG. 1. In FIG. 2A, two cameras C1 and C2 are illustrated. These may be similar or essentially the same as the camera C1 in FIG. 1. Also, FIG. 2A illustrates a showroom with cars before a background BG1. These cars are again labelled A and B, respectively, and may be essentially the same cars as in FIG. 1. On the other hand, FIG. 2B illustrates a different showroom with two different cars, labelled C and D. Cars C and D are shown in front of background BG2. FIG. 2B further shows cameras C3 and C4. These cameras C3 and C4 may be independent of cameras C1 and C2 shown in FIG. 2A. FIG. 2B indicates a person P3 in the showroom having background BG2. That is, FIG. 2B indicates a person P3 showing some interest in items, i.e. cars, C and D in front of background BG2, but not of background BG1. Consequently, it has to be assumed that the person has no interest or at least less interest in cars A and B shown in front of background BG1, cf. FIG. 2A. Assuming that both showrooms belong to the same car dealership, if the person P3 can be re-identified with respect to background BG2, it may be concluded that person P3 is at least more interested in the cars C and D as shown in FIG. 2B than those cars A and B in FIG. 2A. This finding may be conveyed to the dealership personnel who may than react appropriately. Of course, for example if controllable advertising screens are available, these findings may also be used to place detailed advertisements in the environment of person P3 within the scenario of background BG2 of FIG. 2B.

The invention claimed is:

1. A computer-implemented method of re-identifying a physical object before an image background, the method executed by one or more processing devices and comprising:
   providing image data comprising an image object representing a physical object before at least one image background of a set of image backgrounds pre-stored in a database;
   extracting identification data for the image object as well as image background data from the image data; and
   determining if the identification data matches identification data stored in the database, and if no match is found, creating a temporary data object linking the extracted identification data and the extracted image background data and storing the temporary data object and the extracted identification data in the database, else
   determining if a temporary data object linking the extracted image background data and the matched identification data has already been stored in the database, and if no temporary data object is found, creating a temporary data object linking the extracted identification data and the extracted image background data and storing the temporary data object in the database, else
   determining if the temporary data object fulfills at least one predetermined condition, and if no predetermined condition is fulfilled, executing a default action with respect to the temporary data object, else
   executing a specific action to call attention of an external user,
   wherein the predetermined condition comprises at least one selected from the group of a temporal condition and a repetition condition;
   wherein the temporal condition comprises determining whether a timestamp of the temporary data object is within a time window delimited by a past time t2 and a past time t1, where t2 is earlier than t1, and;
   wherein the temporary data object comprises a timestamp indicating a creation time of the temporary data object, and a match counter indicating a number of times a match for the temporary data object has been found.

2. The computer-implemented method according to claim 1, wherein providing the image data comprises recording video data and providing at least one video frame of the recorded video data.

3. The computer-implemented method according to claim 2, further comprising analyzing of the image data and, wherein the analyzing of the image data and the recording of the video data are performed in real time.

4. The computer-implemented method according to claim 1, wherein the physical object is a person or a face of a person.

5. The computer-implemented method according to claim 1, wherein providing the image data comprises recording video data and providing at least one video frame of the recorded video data.

6. The computer-implemented method according to claim 5, wherein the physical object is a person or a face of a person.

7. The computer-implemented method according to claim 5, further comprising analyzing of the image data and wherein analyzing of the image data and recording of the video data are performed in real time.

8. The computer-implemented method according to claim 7, wherein the physical object is a person or a face of a person.

9. The computer-implemented method according to claim 1, wherein if the timestamp of the temporary data object is earlier than t2, resetting the timestamp of the temporary data object to a current time and resetting a match counter.

10. The computer-implemented method according to claim 1, wherein the repetition condition comprises determining if a match counter has reached a pre-determined threshold N, where N is an integer larger than 1, and resetting the match counter if the threshold has been reached.

11. The computer-implemented method according to claim 1, wherein the specific action comprises at least one selected from the group of an optical and an acoustical signal, wherein the default action comprises increasing a match counter by 1.

12. The computer-implemented method according to claim 1, wherein the set of image backgrounds comprise at least one selected from the group of a sales area, at least a part of a shop, an exhibition area, a display area, and a showroom.

13. The computer-implemented method according to claim 1, wherein the determining whether the image object corresponds to the physical object comprises determining a probability measure of a matching of the image object with the physical object and further comprising determining that the image object corresponds to the physical object, if the determined probability measure exceeds a predetermined threshold; wherein the determining of the probability measure comprises matching the image object with the physical object by comparing the identification data with pre-stored data of the particular physical object.

14. The computer-implemented method according to claim 1, further comprising analyzing the image data by employing a face recognition procedure comprising extracting jets from the image data.

15. A computer program product, comprising one or more non-transitory computer readable media having computer-executable instructions for performing the steps of a computer-implemented method comprising:
   providing image data comprising an image object representing a physical object before at least one image background of a set of image backgrounds pre-stored in a database;
   extracting identification data for the image object as well as image background data from the image data; and
   determining if the identification data matches identification data stored in the database, and if no match is found, creating a temporary data object linking the extracted identification data and the extracted image background data and storing the temporary data object and the extracted identification data in the database, else
   determining if a temporary data object linking the extracted image background data and the matched identification data has already been stored in the database, and if no temporary data object is found, creating a temporary data object linking the extracted identification data and the extracted image background data and storing the temporary data object in the database, else
   determining if the temporary data object fulfills at least one predetermined condition, and if no predetermined condition is fulfilled, executing a default action with respect to the temporary data object, else
   executing a specific action to call attention of an external user,
   wherein the predetermined condition comprises at least one selected from the group of a temporal condition and a repetition condition,
   wherein the temporal condition comprises determining whether a timestamp of the temporary data object is within a time window delimited by a past time t2 and a past time t1, where t2 is earlier than t1, and;
   wherein the temporary data object comprises a timestamp indicating a creation time of the temporary data object, and a match counter indicating a number of time a match for the temporary data object has been found.

16. A system for re-identifying a physical object before an image background, comprising one or more cameras surveying one or more perspectives of a predefined area, at least one processor, at least one database, the at least one database and the at least one processor linked with the one or more cameras, the processor configured to perform a computer-implemented method comprising:
   providing image data comprising an image object representing a physical object before at least one image background of a set of image backgrounds pre-stored in a database;
   extracting identification data for the image object as well as image background data from the image data; and
   determining if the identification data matches identification data stored in the database, and if no match is found, creating a temporary data object linking the extracted identification data and the extracted image background data and storing the temporary data object and the extracted identification data in the database, else
   determining if a temporary data object linking the extracted image background data and the matched identification data has already been stored in the database, and if no temporary data object is found, creating a temporary data object linking the extracted identification data and the extracted image background data and storing the temporary data object in the database, else
   determining if the temporary data object fulfills at least one predetermined condition, and if no predetermined condition is fulfilled, executing a default action with respect to the temporary data object, else
   executing a specific action to call attention of an external user,
   wherein the predetermined condition comprises at least one selected from the group of a temporal condition and a repetition condition,
   wherein the temporal condition comprises determining whether a timestamp of the temporary data object is within a time window delimited by a past time t2and a past time t1, where t2 is earlier than t1, and;
   wherein the temporary data object comprises a timestamp indicating a creation time of the temporary data object, and a match counter indicating a number of times a match for the temporary data object has been found.

* * * * *